(12) United States Patent
Wu et al.

(10) Patent No.: US 10,605,948 B2
(45) Date of Patent: Mar. 31, 2020

(54) BOREHOLE IMAGING SENSOR ASSEMBLY

(71) Applicant: HALLIBURTON ENERGY SERVICES, INC., Houston, TX (US)

(72) Inventors: Hsu-Hsiang Wu, Sugar Land, TX (US); Yumei Tang, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 104 days.

(21) Appl. No.: 15/501,206

(22) PCT Filed: Apr. 19, 2016

(86) PCT No.: PCT/US2016/028236
§ 371 (c)(1),
(2) Date: Feb. 2, 2017

(87) PCT Pub. No.: WO2017/184117
PCT Pub. Date: Oct. 26, 2017

(65) Prior Publication Data
US 2018/0188406 A1    Jul. 5, 2018

(51) Int. Cl.
*G01V 1/40* (2006.01)
*G01V 3/18* (2006.01)
(Continued)

(52) U.S. Cl.
CPC .................. *G01V 3/20* (2013.01); *G01V 3/18* (2013.01); *G01V 3/30* (2013.01); *G01V 3/38* (2013.01)

(58) Field of Classification Search
CPC . G01V 1/00; G01V 11/00; G01V 1/30; G01V 1/48; G01V 1/50; G01V 3/20; G01V 3/18; G01V 3/30; G01V 3/38
(Continued)

(56) References Cited

U.S. PATENT DOCUMENTS

| 4,567,759 A | 2/1986 | Ekstrom et al. |
| 5,255,245 A | 10/1993 | Clot |

(Continued)

FOREIGN PATENT DOCUMENTS

| EP | 2749910 | 7/2014 |
| WO | 2013074593 | 5/2013 |

OTHER PUBLICATIONS

Itskovich et al., An Improved Resistivity Imager for Oil-Based Mud: Basic Physics and Applications, 2014, 2 pages.
(Continued)

*Primary Examiner* — Michael P Nghiem
(74) *Attorney, Agent, or Firm* — Kilpatrick Townsend & Stockton LLP

(57) ABSTRACT

A system and method for minimizing the standoff effect on an imaging tool in a borehole are provided. The imaging tool may include a sensor assembly for transmitting current in the direction of the formation to obtain complex measurements having a real part and an imaginary part. The real-part measurement may be sensitive to, or affected by, the resistivity of the formation and the standoff of the imaging tool. The imaginary-part measurement may be affected by only to standoff. A computing device may determine a ratio using the imaginary-part measurement and corresponding to change in standoff at various imaging tool azimuths. The ratio may be applied to the real-part measurement to enhance the resolution of image data corresponding to formations adjacent to the wellbore.

19 Claims, 16 Drawing Sheets

(51) Int. Cl.
  *G01V 5/04* (2006.01)
  *G01V 3/20* (2006.01)
  *G01V 3/38* (2006.01)
  *G01V 3/30* (2006.01)

(58) Field of Classification Search
  USPC .................................................... 702/6, 11
  See application file for complete search history.

(56) References Cited

U.S. PATENT DOCUMENTS

| | | | |
|---|---|---|---|
| 5,519,668 | A | 5/1996 | Montaron et al. |
| 6,191,588 | B1 | 2/2001 | Chen et al. |
| 6,809,521 | B2 | 10/2004 | Tabarovsky et al. |
| 7,098,664 | B2 | 8/2006 | Bittar et al. |
| 7,103,982 | B2 | 9/2006 | Haugland et al. |
| 7,394,258 | B2 | 7/2008 | Itskovich et al. |
| 7,397,250 | B2 | 7/2008 | Bespalov et al. |
| 7,432,716 | B2 | 10/2008 | Forgang et al. |
| 7,558,675 | B2 | 7/2009 | Sugiura et al. |
| 7,689,363 | B2 | 3/2010 | Itskovich et al. |
| 7,888,941 | B2 | 2/2011 | San Martin et al. |
| 8,174,266 | B2 | 5/2012 | Gold et al. |
| 8,633,701 | B2 | 1/2014 | Itskovich et al. |
| 8,786,288 | B2 | 7/2014 | Gorek et al. |
| 8,866,483 | B2 | 10/2014 | Smollinger et al. |
| 8,886,483 | B2 | 11/2014 | Zhao |
| 8,994,377 | B2 | 3/2015 | Hayman |
| 9,037,415 | B2 | 5/2015 | Zhao |
| 2005/0283315 | A1* | 12/2005 | Haugland ............. E21B 47/082 702/6 |
| 2007/0112521 | A1 | 5/2007 | Akimov et al. |
| 2008/0288171 | A1* | 11/2008 | Itskovich ................. G01V 3/20 702/7 |
| 2009/0276158 | A1 | 11/2009 | Kirkwood et al. |
| 2009/0292471 | A1 | 11/2009 | Bespalov et al. |
| 2010/0019771 | A1 | 1/2010 | Gold et al. |
| 2010/0023268 | A1* | 1/2010 | Gold ......................... G01V 3/24 702/9 |
| 2010/0286916 | A1 | 11/2010 | Wang et al. |
| 2011/0025335 | A1* | 2/2011 | Itskovich ................. G01V 3/24 324/355 |
| 2011/0199089 | A1* | 8/2011 | Hayman ................... G01V 3/24 324/347 |
| 2011/0199090 | A1* | 8/2011 | Hayman ............... E21B 47/082 324/356 |
| 2011/0204897 | A1* | 8/2011 | Hu .......................... G01V 3/24 324/351 |
| 2013/0013210 | A1* | 1/2013 | Itskovich ................. G01V 3/20 702/7 |
| 2014/0184229 | A1* | 7/2014 | Bloemenkamp ......... G01V 3/24 324/369 |
| 2018/0188406 | A1* | 7/2018 | Wu ......................... G01V 3/20 |
| 2018/0321413 | A1* | 11/2018 | Zhong ..................... G01V 3/18 |

OTHER PUBLICATIONS

International Patent Application No. PCT/US2016/028236, International Search Report and Written Opinion, dated Jan. 18, 2017, 10 pages.

EP16899614.8, "Extended European Search Report", dated Nov. 29, 2019, 8 pages.

* cited by examiner

BOREHOLE IMAGING SENSOR ASSEMBLY

CROSS-REFERENCE TO RELATED APPLICATIONS

This is a U.S. national phase under 35 U.S.C. 371 of International Patent Application No. PCT/US2016/028236, titled "Borehole Imaging Sensor Assembly" and filed Apr. 19, 2016, the entirety of which is incorporated herein by reference.

TECHNICAL FIELD

The present disclosure relates generally to borehole systems and, more particularly (but not exclusively), to improving image data quality of information obtained from sensor assemblies of borehole imaging tools.

BACKGROUND

Drilling and production operations may use information related to the conditions downhole in a wellbore environment. Such information may include parameters or characteristics of the borehole, the drilling fluid used for operating a drilling assembly in the borehole, and formations adjacent to the borehole. Imaging tools may be used downhole in the borehole to obtain information regarding the characteristics of the formations adjacent to the borehole and forming a wall of the borehole. An imaging tool may include one or more sensors to measure various parameters of the formation during operation of the drilling assembly. But, the measurements may be sensitive to the position of the sensors in the borehole, the resistivity of the mud in the borehole, and the resistivity of the formations adjacent to the borehole. These sensitivities may affect the quality of image data obtained by the sensors.

DETAILED DESCRIPTION

Figure 1:
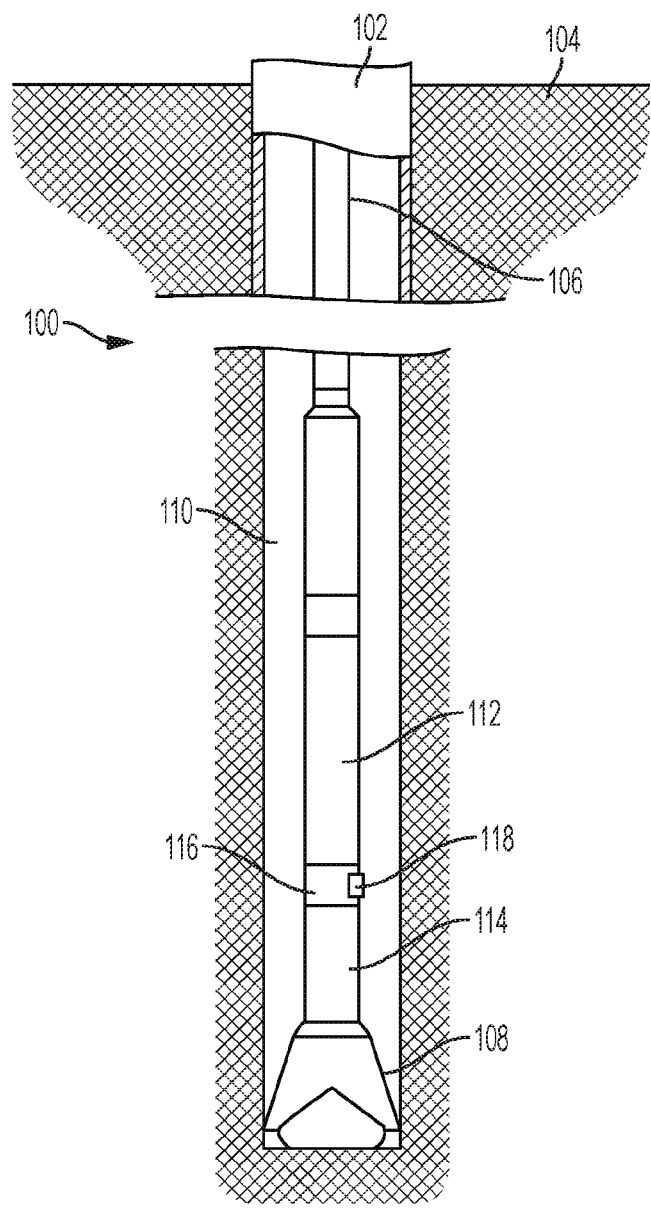
FIG. 1 is a cross-sectional schematic diagram depicting an example of a wellbore environment including a sensor assembly according to one aspect of the present disclosure.

Certain aspects and examples of the present disclosure relate to systems and processes for minimizing the effect of the distance between an imaging tool and the wall of a borehole (e.g., standoff) on measurements of the imaging tool to improve the quality of image data corresponding to formations adjacent to the borehole. An imaging tool according to some aspects may include a sensor assembly having electrodes positioned in the borehole to transmit a current through drilling fluid in the borehole and into formations adjacent to the borehole. The current may be a complex current including a phase and amplitude, resulting in complex measurements being obtained by the sensor assembly having both real and imaginary parts. The position of the imaging tool in the borehole and resulting standoff of the sensor assembly positioned on the imaging tool (e.g., the distance between the sensor assembly and the borehole wall) may affect the complex measurements. In some aspects, the real-part measurement may be sensitive to, or affected by, both the standoff and the resistivity of the formation adjacent to the borehole. The imaginary-part measurement may be sensitive only to standoff and may not be sensitive to the resistivity of formation. The imaginary-part measurement may be used to calculate a ratio corresponding to the relative change in standoff of the sensor assembly as the imaging tool rotates in the borehole. The real-part measurement may be adjusted to determine an adjusted real-part measurement using the ratio to minimize the effect of the standoff on the image data and enhance the resolution of the graphical representation of the formation resistivity.

According to some aspects, the adjusted real measurement determined by a computing device may provide a simple and efficient approach for improving the quality of the image data of the formation. For example, the adjusted real-part measurement may be a relative measurement rather than a quantitative measurement requiring specific values for accuracy. A computing device and sensor assembly according to some aspects of the present disclosure may achieve enhanced image resolution without requiring additional or complicated processes for determining exact standoff distances, formation resistivity, and other values. Formation images, generally, may be intended to capture variations in the properties of the formations adjacent to a borehole. The adjusted real-part measurement allows the variations to be sufficiently captured relative to each of the different properties. Further, the use of real and imaginary parts of the same complex measurements may allow the standoff of the sensor assembly to be consistent across the different azimuths of the imaging tool as it rotates in the borehole.

Detailed descriptions of certain examples are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure. The various figures described below depict examples of implementations for the present disclosure, but should not be used to limit the present disclosure.

Various aspects of the present disclosure may be implemented in various environments. For example, FIG. 1 is a cross-sectional schematic diagram depicting an example of a wellbore environment 100 including a wellbore, or borehole 102, extending from a surface 104 into the earth. A drill string 106 of a drilling rig (not shown) may include segmented pipes that may extend below the surface 104 into the borehole 102. The drill string 106 may transmit drilling fluid (or mud) into the borehole 102. The mud transmitted by the drill string 106 may provide the torque necessary to operate a drill bit 108 connected to a downhole end of the drill string 106. The mud may also fill the borehole 102 in an annulus formed between the drill string 106 and a wall 110 of the borehole 102 to transport cuttings extracted from the borehole 102 by the drill bit 108 to the surface 104. The drill string 106 also includes a bottom hole assembly 112. The bottom hole assembly 112 may be include various drilling components, such as a downhole motor assembly 114 for housing a motor for the drill bit 108 and a stabilizer device 116 mounted to a collar of the drill string 106. In some aspects, the stabilizer device 116 may enhance the mechanical stability of the drill string 106 and prevent unintentional sidetracking of the drill bit 108 and other drilling components connected to the drill string 106.

A sensor assembly according to some aspects may be positioned at the surface 104 or in the borehole 102 to obtain electrical resistivity measurements for imaging formations adjacent to the borehole 102. The wall 110 of the borehole 102 may include the formations. Though placement of the sensor assembly disclosed herein may vary without departing from the scope of the present subject matter, FIG. 1 depicts sensor assembly 118 placed on or near an external surface of the stabilizer device 116 according to one aspect.

Figure 2:
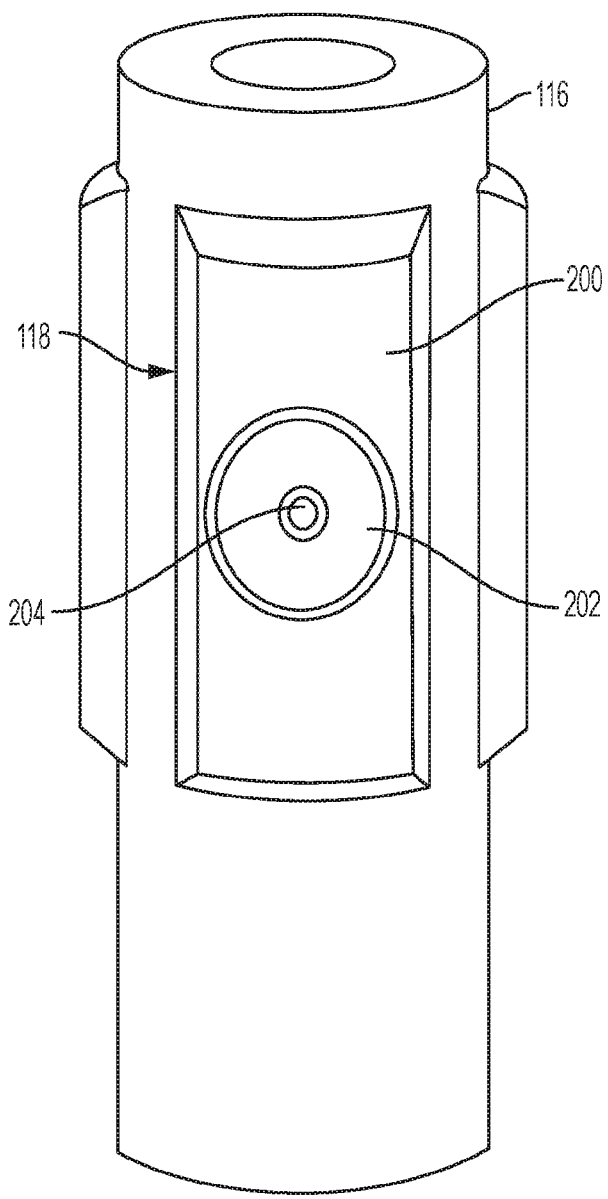
FIG. 2 is a perspective view of the sensor assembly of FIG. 1 positioned on a stabilizer device according to one aspect of the present disclosure.

FIG. 2 is a perspective view of the sensor assembly 118 of FIG. 1 positioned on one of the blades 200 of the stabilizer device 116 according to one aspect of the present disclosure. The stabilizer device 116 may include one or more blades 200 extending from a body of the stabilizer device 116. In some aspects, the blades 200 may be positioned in the borehole 102 to interfere with the wall 110 of the borehole 102 in the event of a deviation of the drill string 106 or the drill bit 108 from an intended path. The interference between the blades 200 of the stabilizer device 116 and the wall 110 of the borehole 102 may serve to maintain the drill string 106 or the drill bit 108 on the intended path. In some aspects, the blades 200 may be straight blades positioned on the body of the stabilizer device 116 as shown in FIG. 2. In other aspects, the blades 200 may be spirally positioned on the body of the stabilizer device 116. Although the sensor assembly 118 is show in FIG. 2 as positioned on the stabilizer device 116, the sensor assembly 118 may be positioned on various tools mounted or otherwise connected to the drill string 106 of FIG. 1 without departing from the scope of the present disclosure.

The sensor assembly 118 may include one or more electrodes. For example, the sensor assembly 118 shown in FIG. 2 includes a guard electrode 202 positioned on the blade 200 and a button electrode 204 positioned on the blade such that the guard electrode 202 surrounds the button electrode 204. The guard electrode 202 and the button electrode 204 may include electrical conductors configured to transmit a current in response to a voltage potential being applied to the electrodes 202, 204. In some aspects, the guard electrode 202 may be positioned around the button electrode 204 to focus the current transmitted by the button electrode 204.

Figure 3:
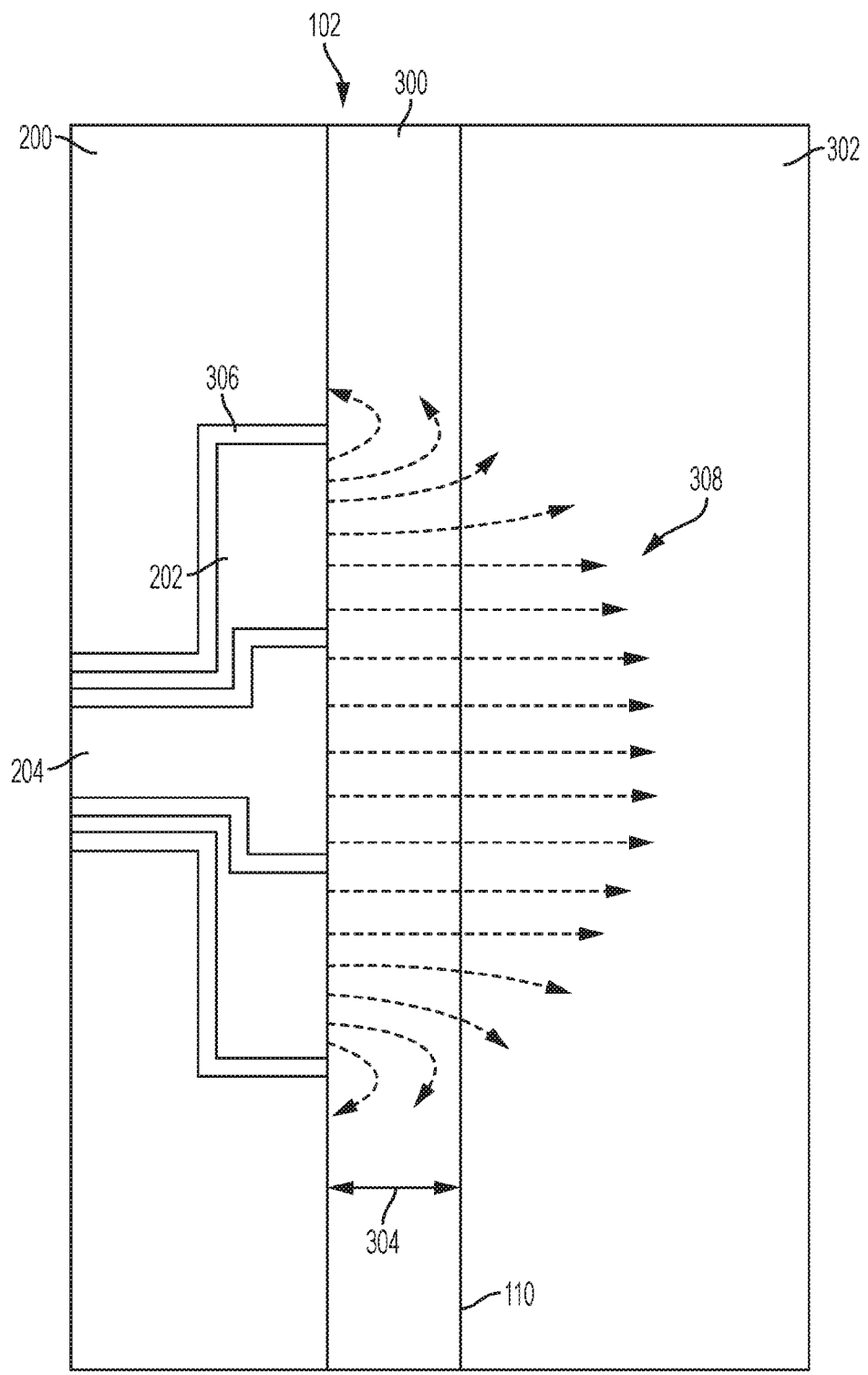
FIG. 3 is a cross-sectional view of the sensor assembly of FIGS. 1 and 2 positioned in a borehole adjacent to a formation according to one aspect of the present disclosure.

FIG. 3 is a cross-sectional view of the guard electrode 202 and the button electrode 204 position on the blade 200. The blade 200 is positioned in the borehole 102 according to one aspect of the present disclosure. The borehole 102 includes a medium 300 (e.g., drilling fluid, or mud) in an annulus between the blade 200 and the wall 110 of the borehole 102. The guard electrode 202 and the button electrode 204 may be positioned in the medium 300 of the borehole 102 proximate to a formation 302 that is adjacent to the borehole 102 and includes the wall 110 of the borehole 102. The distance between the electrodes 202, 204 and the wall 110 of the borehole 102 may represent the standoff 304. In some aspects, the standoff 304 may vary as tool on which the electrodes 202, 204 are positioned rotates or otherwise moves within the borehole 102. In some aspects, the effect of the standoff 304 may alter or skew the measurements obtained by the electrodes 202, 204.

In some aspects, a voltage potential may be applied to the guard electrode 202 and the button electrode 204 to cause the electrodes 202, 204 to transmit current into the medium 300 and the formation 302. The guard electrode 202 and the button electrode 204 may be electrically isolated by isolation devices 306 to prevent electrical signals from unintentionally migrating between the guard electrode 202 and the button electrode 204. In some aspects, the voltage potential applied to the guard electrode 202 and the button electrode 204 may be the same. In additional and alternative aspects, a ground potential may be applied to the blade 200. The voltage potential applied to the guard electrode 202 and the button electrode 204, together with the ground potential applied to the blade 200, may cause the current to be injected into the medium 300 and the formation 302, focusing the current distribution proximate to the button electrode 204. The dashed lines 308 may represent the electric current transmitted into the medium 300 and the formation 302. The amplitude of the current in the button electrode 204 may be used to determine the resistivity of the formation 302.

Figure 4:
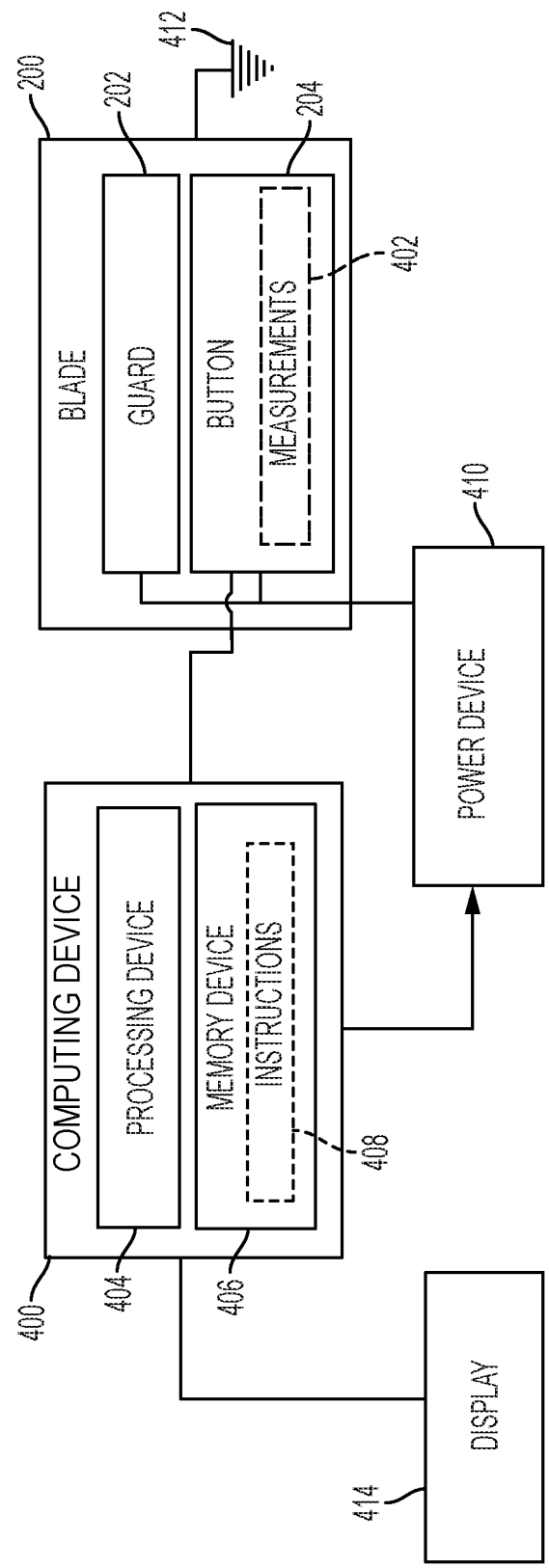
FIG. 4 is a block diagram of a sensor assembly including a computing device according to one aspect of the present disclosure.

FIG. 4 shows a block diagram of the sensor assembly 118 of FIG. 2 including a computing device 400 according to one aspect of the present disclosure. In some aspects, the computing device 400 may be positioned at the surface 104 of the borehole 102. In other aspects, one or more components of the computing device 400 may be mounted to the drill string 106 or otherwise positioned downhole in the borehole 102. The computing device 400 may be coupled to one or both of the guard electrode 202 and the button electrode 204 positioned on the blade 200. For example, in FIG. 4, the computing device 400 is coupled to the button electrode 204 to receive one or more measurements 402.

The computing device may include a processing device 404 and a memory device 406. The processing device 404 may execute instructions 408 including one or more algorithms for minimizing the effect of standoff 304 to improve the imaging data quality (e.g., resolution) of formation properties. The instructions 408 may be stored in the memory device 406 coupled to the processing device 404 to allow the processing device 404 to perform the operations. The processing device 404 may include one processing device 404 or multiple processing devices. Non-limiting examples of the processing device 404 may include a field-programmable gate array ("FPGA"), an application-specific integrated circuit ("ASIC"), a microprocessor, etc. The non-volatile memory device 406 may include any type of storage device that retains stored information when powered off. Non-limiting examples of the memory device 406 may include electrically erasable and programmable read-only memory ("EEPROM"), a flash memory, or any other type of non-volatile memory. In some examples, at least a portion of the memory device 406 may include a computer-readable medium from which the processing device 404 can read the instructions 408. A computer-readable medium may include electronic, optical, magnetic, or other storage devices capable of providing the processing device 404 with computer-readable instructions or other program code. Non-limiting examples of a computer-readable medium include, but are not limited to, magnetic disks, memory chips, ROM, random-access memory ("RAM"), an ASIC, a configured processor, optical storage, or any other medium from which a compute processor can read the instructions 408. The instructions 408 may include processor-specific instructions generated by a compiler or an interpreter from code written in any suitable computer-programming language, including, for example, C, C+++, C#, etc.

In some examples, the instructions 408 may include the following general equation for determining an apparent impedance $R_a$ using amplitude measurements:

$$R_a = k \frac{V}{I},$$

where k is a calibration constant, V is a voltage potential applicable to the guard electrode 202 and the button electrode 204, and I is the in-phase magnitude of the current flow from the button electrode 204.

The instructions 408 may also include the following equation for determining a relative amplitude ratio at different tool azimuth:

$$\text{Ratio}(\beta) = \frac{imag\{Z(\beta)\}}{RefZ},$$

where Z is a complex impedance measurement (e.g., an impedance measurement including a real impedance measurement and an imaginary impedance measurement) and $\beta$ is the tool (e.g., stabilizer device 116) azimuth angle. RefZ may be defined as:

$$\text{RefZ}=\min(\text{imag}\{Z(0\sim360°)\}), \text{ or}$$
$$\Sigma_{\beta=0°}^{360°}\text{imag}\{Z(\beta)\},$$

which may represent the minimum value, the maximum value, the sum value, or average of an imaginary impedance measurement at a given depth of the tool.

The instructions 408 may also include the following equations for determining a real impedance measurement adjusted to minimize the effect of standoff:

$$Z_{real_{adj}}(\beta)=\text{real}\{Z(\beta)\}/\text{Ratio}(\beta),$$

where $\text{real}\{Z(\beta)\}$ is an original real impedance measurement of the sensor assembly 118, and $$Z_{real_{adj}}(\beta) = \frac{\text{real}\{Z(\beta)\}}{1+(\text{Ratio}(\beta)-1)\times ScaleFactor},$$

where the ScaleFactor is used to optimize imaging quality and controlled by a user. In some aspects, the ScaleFactor may be a weighed factor within a certain depth range of a log to enhance visualization of a borehole condition from imaging within the depth range. In one example, high resistivity formations may be located within a measured depth of 0 to 10 meters and low resistivity formations may be located within a measured depth of 10 to 20 meters. A user may set a ScaleFactor as 0.6 for adjusted imaging within the measured depth of 0 to 10 meters and as 1.0 for logs within a measured depth of 10 to 20 meters to allow better visualization of a local borehole imaging profile.

In some examples, the computing device 400 may determine an input for the instructions 408 based on the measurements 402 from the button electrode 204. For example, the button electrode 204 may measure a parameter associated with an impedance measurement of a current and transmit associated signals to the computing device 400. Although impedance measurements are described herein, due to the relationship of the impedance to the current and the voltage, the computing device 400 may similarly measure parameters associated with a voltage measurement or a current measurement. The computing device 400 may receive the signals, extract data from the signals and store the measurements 402 in the memory device 406.

In some aspects, in addition to the button electrode 204, the computing device 400 may also be coupled to a power device 410. The power device 410 may include one or more components to apply a voltage potential to the guard electrode 202 and the button electrode 204. In some aspects, the power device 410 may be positioned at the surface 104 of the borehole 102. In other aspects, one or more components may be positioned on the drill string 106 in the borehole 102. The power device 410 may include a battery or may be connected to another power source via suitable means. In some aspects, the power device 410 may include one or more amplifiers to increase or decrease the voltage potential applied to the guard electrode 202 or the button electrode 204. In some aspects, the computing device 400 may include instructions 408 to cause the power device 410 to apply a voltage potential to the guard electrode 202 and the button electrode 204 at a specified amount. The blade 200 may be connected to a ground source 412 such that when the voltage potential is applied by the power device 410, a focusing current is transmitted by the guard electrode 202 and the button electrode 204.

In some aspects, the computing device 400 may generate image data associated with the information generated by the processing device 404 to be displayed on a display unit 414 information generated by the processing device 404 to be displayed on a display unit 414 coupled to the computing device 400. The display unit 414 may include any CRT, LCD, OLED, or other device for displaying interfaces generated by the processing device 404.

Figure 5A:
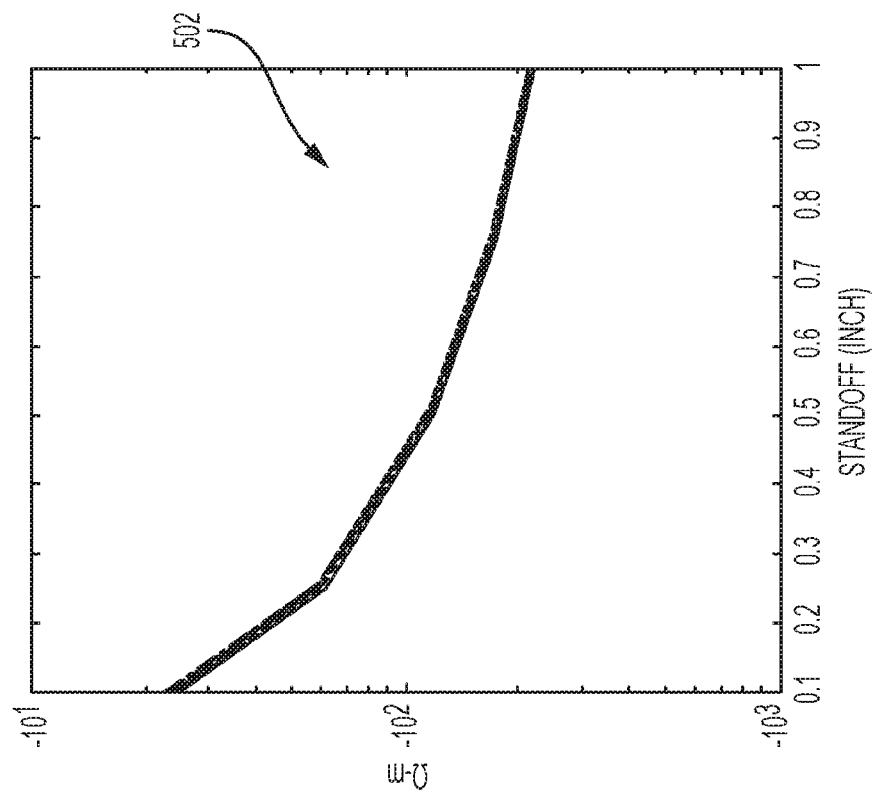
FIG. 5A is a graphical illustration of measurements obtained by a sensor assembly operating at a high frequency according to one aspect of the present disclosure.
Figure 5A:
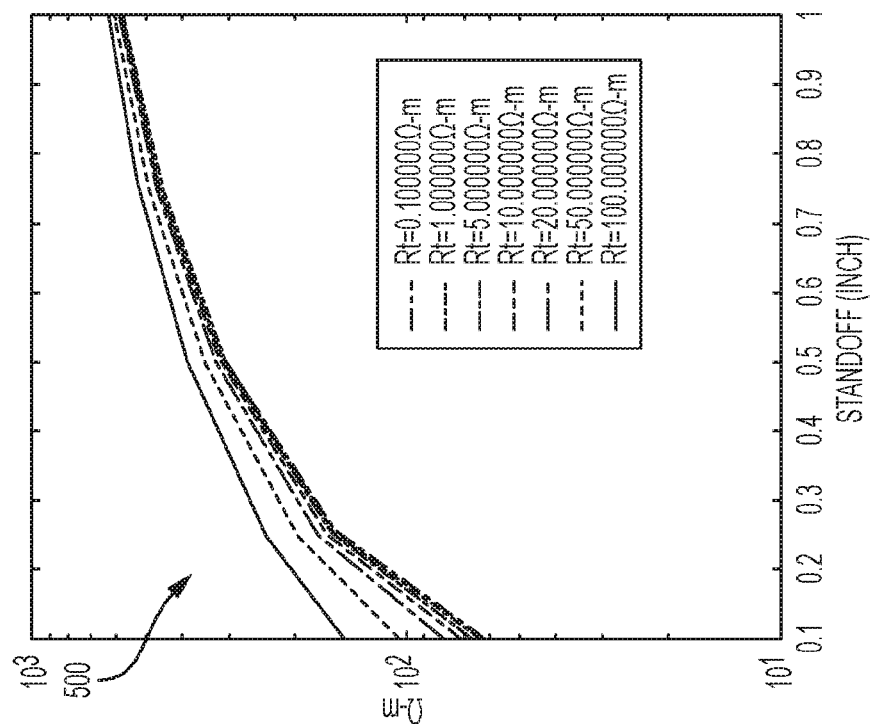
Figure 5B:
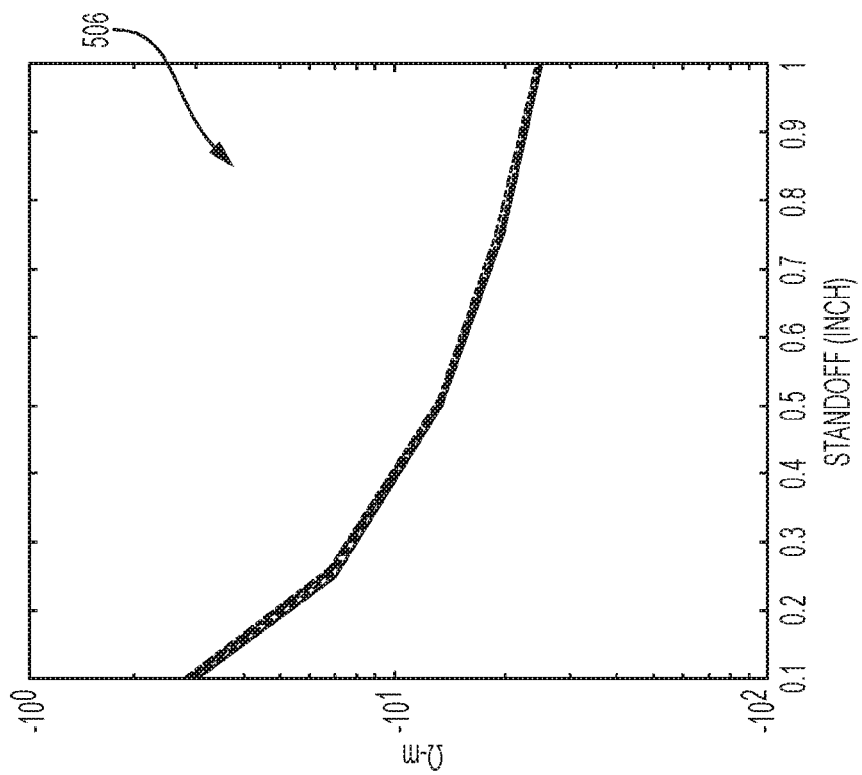
FIG. 5B is a graphical illustration of measurements obtained by a sensor assembly operating at a low frequency according to one aspect of the present disclosure.
Figure 5B:
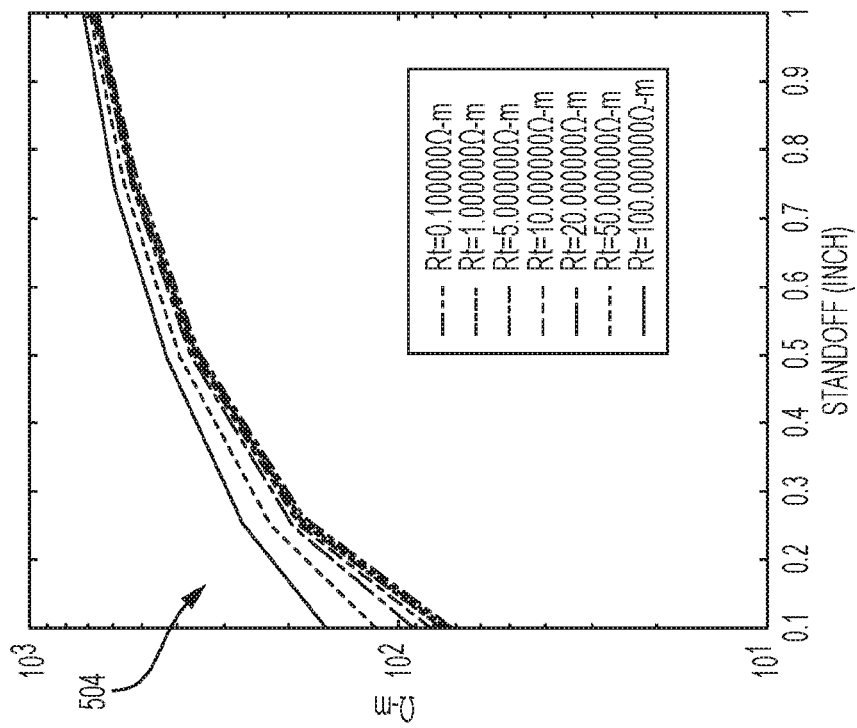

FIGS. 5A and 5B show graphical illustrations modeling measurements that may be included in the measurements 402 obtained by the guard electrode 202 or the button electrode 204 of FIG. 4 according to one aspect of the present disclosure. An oil-based mud is used in the modeling having a resistivity of 1000Ω·m. FIG. 5A includes measurements 500, 502 corresponding to different standoff distances at a frequency of 2.25 MHz. Measurements 500 correspond to a real, or real-part, impedance measurement for different formation resistivities. Measurements 502 correspond to the imaginary, or imaginary-part, impedance measurement for the different formation resistivities. FIG. 5B includes measurements 504, 506 corresponding to different standoff distances at a frequency of 225 kHz. Measurements 504 correspond to the real impedance measurement for different formation resistivities. Measurements 506 correspond to the imaginary impedance measurement for the different formation resistivities. The real and imaginary parts of the impedance measurements 500, 502, 504, 506 may be due to the complex current measured by the computing device 400 at the button electrode 204 of FIG. 4. The current may include a phase and amplitude.

As indicated by the measurements 500, 504 of FIGS. 5A and 5B, the real-part impedance at higher and lower frequencies may be affected by to both formation resistivity and standoff effect. As such, the measurements 500, 504 vary for different formation resistivities and standoff distances, resulting in different real impedance measurements that may lower the quality of image data of the formations when the standoff effect is not taken into account. The measurements 502, 506 of FIGS. 5A and 5B indicate that the imaginary-part impedance is only affected by the standoff effect at both higher and lower frequencies (e.g., the imaginary-part impedance is not affected by the resistivity of the formation). As such, the measurements 502, 506 are approximately the same for varying formation resistivities. Because the measurements 502, 506 are affected by the standoff effect and not to formation resistivity, the measurements 502, 506 may be used to determine the standoff. The imaginary impedance measurement may be used to calculate a relative amplitude ratio that may be applied to the real impedance measurement for determining an adjusted real impedance measurement that minimizes the effect of the standoff.

Figure 6:
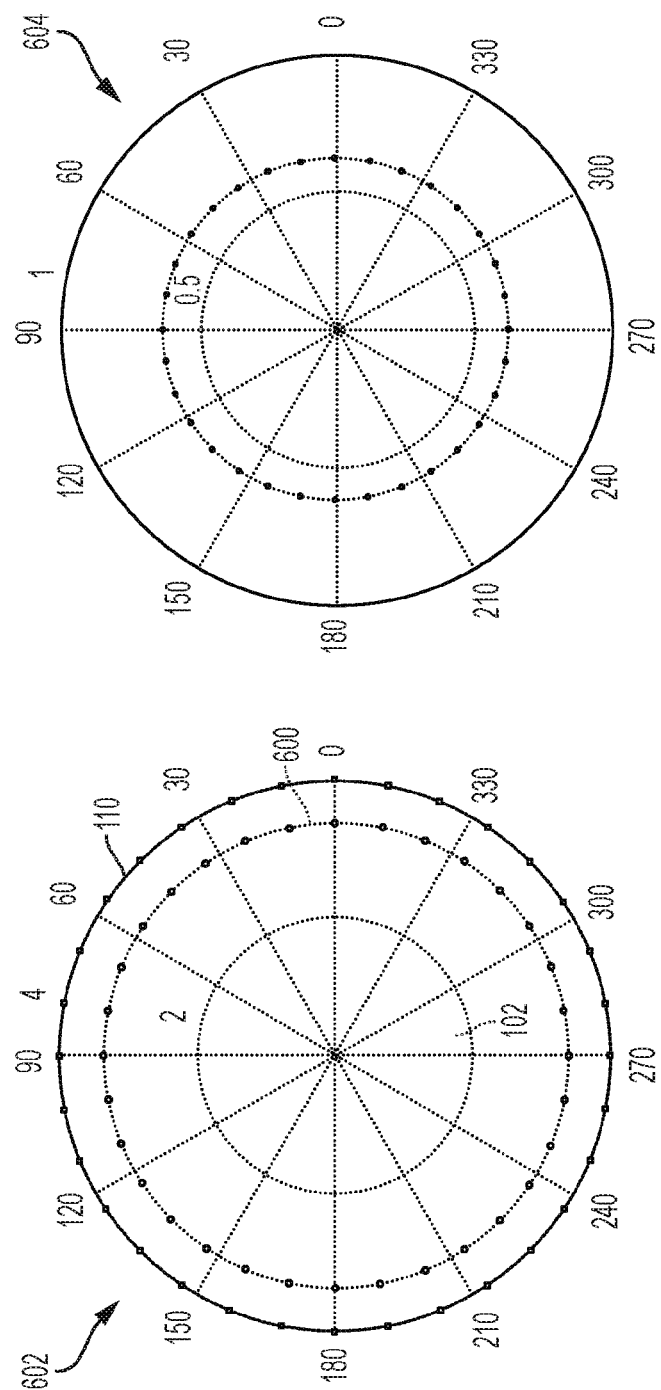
FIG. 6 is a cross-sectional view of an imaging tool centrally positioned in the borehole of FIG. 1 and the corresponding standoff relative to a homogeneous formation according to one aspect of the present disclosure.

FIG. 6 a cross-sectional and graphical view of an imaging tool 600 centrally positioned in the borehole 102 of FIG. 1 and the corresponding standoff relative to a homogeneous formation adjacent to the wall 110 of the borehole 102 according to one aspect of the present disclosure. The imaging tool 600 may be any tool including one or more sensors for obtaining measurements to generate images of a formation adjacent to the borehole 102. In some examples, the imaging tool 600 may represent the stabilizer device 116 with the sensor assembly 118 of FIGS. 1-2. In some aspects, the imaging tool 600 may be operable at multiple frequencies, including high frequencies (e.g., 2.25 MHz) and low frequencies (e.g., 225 kHz). Graph 602 of FIG. 6 shows the imaging tool 600 placed in the center of the borehole 102. In some aspects, the outer surface of the imaging tool 600 may include a sensor. Graph 604 represents the standoff of the imaging tool 600 versus the azimuth of the imaging tool 600 (e.g., the angular measurement of the imaging tool 600 as it rotates along its vertical axis from 0° to 360°). As the imaging tool 600 rotates in the borehole 102, the outer surface of the imaging tool 600 and the sensor attached thereto may be a constant distance from the wall 110 of the borehole 102 (e.g., a constant standoff value).

Figure 7:
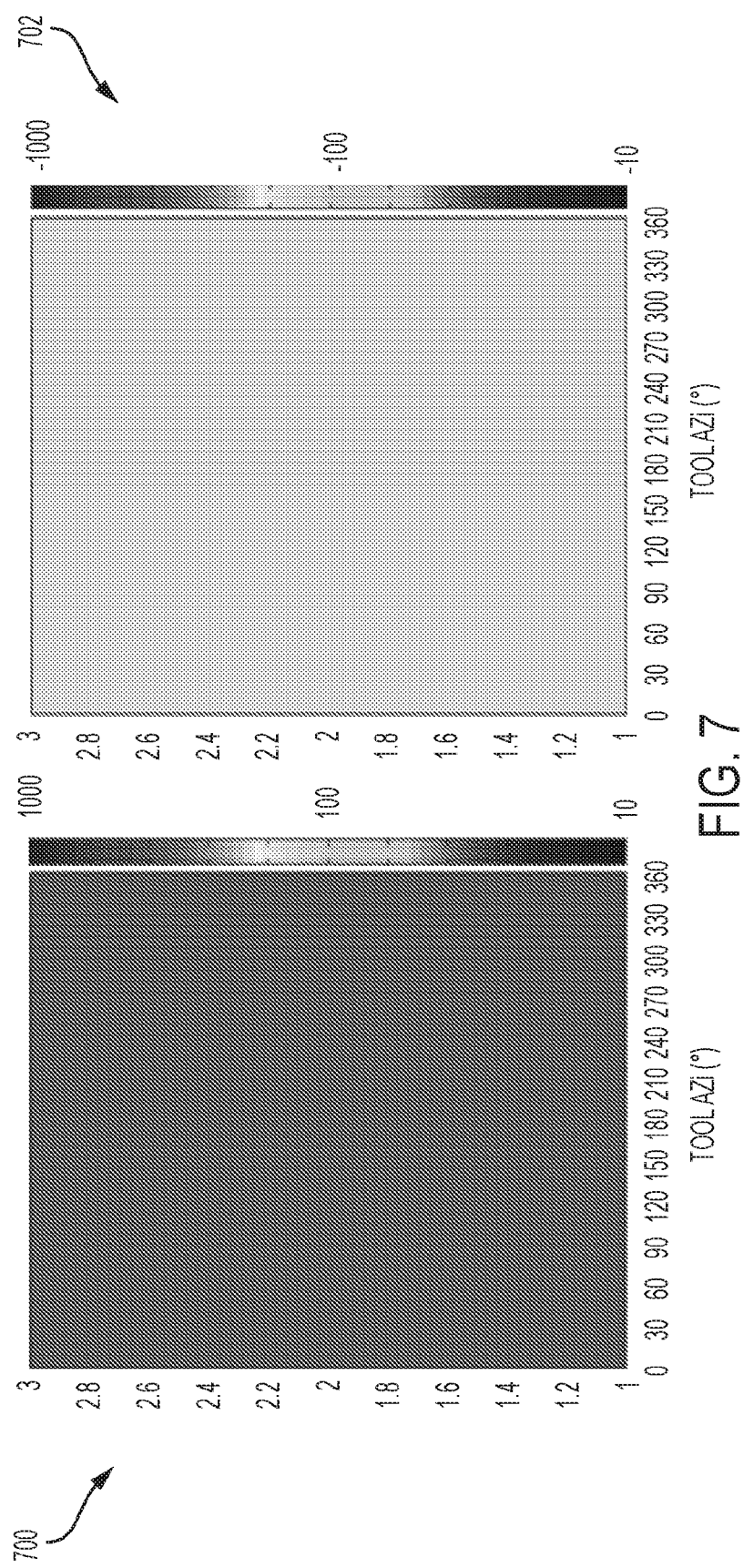
FIG. 7 is a graphical model of measurements obtained by the imaging tool of FIG. 6 according to one aspect of the present disclosure.

FIG. 7 is a graphical model of impedance measurements obtained by the imaging tool 600 of FIG. 6 according to one aspect of the present disclosure. Model 700 represents the real impedance measurement obtained by the imaging tool 600. Model 702 represents the imaginary impedance measurement obtained by the imaging tool 600. The impedance measurements may be obtained at a high frequency (e.g., 2.25 MHz) as shown in FIG. 7 or at a low frequency. Since the imaging tool 600 has the same standoff and formation resistivity at each azimuth, both the real impedance measurement and the imaginary impedance measurement may be one specific value at any azimuth. For example, the real impedance measurement may be read as approximately 375Ω·m and the imaginary impedance measurement may be read as approximately −139Ω·m.

Figure 8:
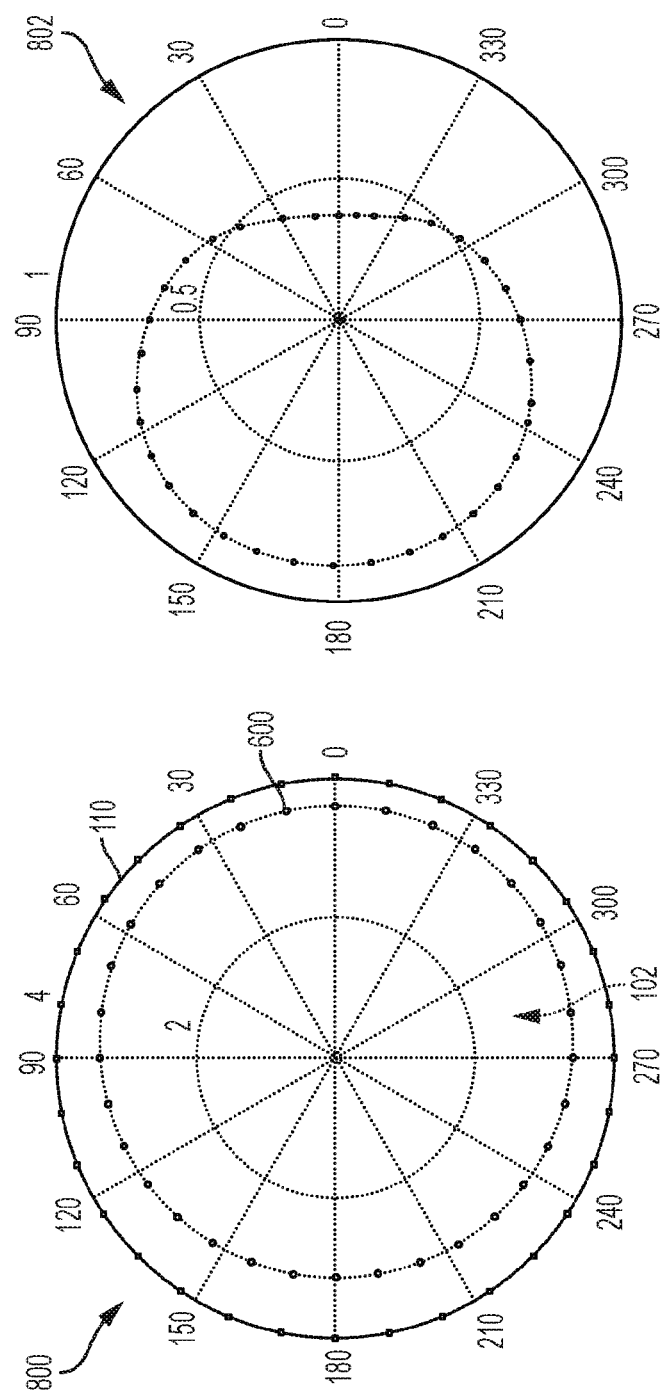
FIG. 8 is a cross-sectional view of an imaging tool positioned off-center in the borehole of FIG. 1 and the corresponding standoff relative to a homogeneous formation according to one aspect of the present disclosure.

FIG. 8 is a cross-sectional and graphical view of the imaging tool 600 positioned off-center in the borehole 102 and the corresponding standoff relative to a homogeneous formation according to one aspect of the present disclosure. Graph 800 of FIG. 8 shows the imaging tool 600 positioned slightly right of the center of the borehole 102 such that distance between the imaging tool 600 and the wall 110 of the borehole 102 (e.g., the standoff) vary at different azimuths of the imaging tool 600. Graph 802 shows the standoff of the imaging tool 600 versus the azimuth of the imaging tool 600. As illustrated by the graph 802, the standoff changes as the imaging tool 600 is rotated in the borehole 102. The differing standoff measurements may cause different impedance readings as shown in FIG. 9.

Figure 9:
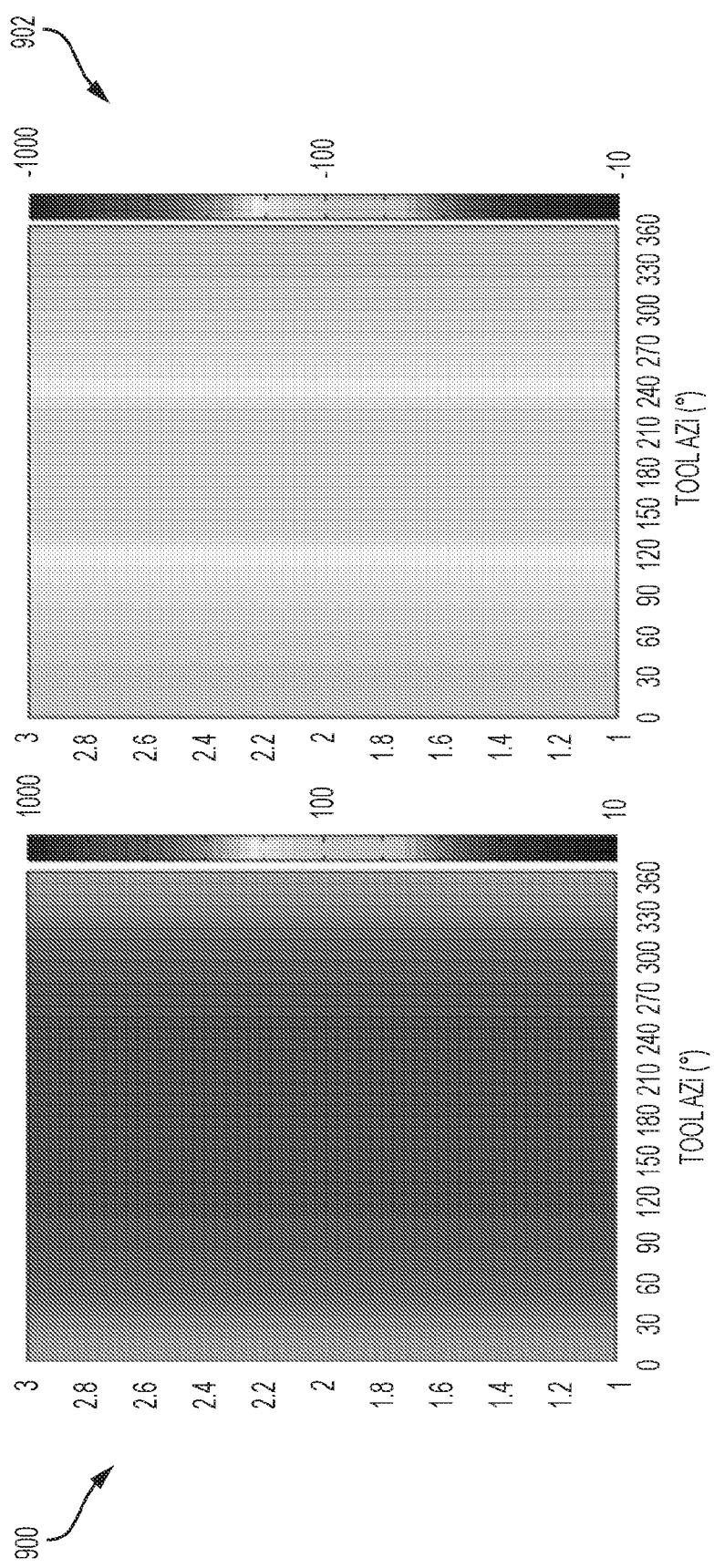
FIG. 9 is a graphical model of measurements obtained by the imaging tool of FIG. 8 according to one aspect of the present disclosure.

FIG. 9 is a graphical model of measurements obtained by the imaging tool 600 of FIG. 8 according to one aspect of the present disclosure. Model 900 represents the real impedance measurement of the imaging tool 600 at different azimuths. Model 902 represents the imaginary impedance measurement of the imaging tool 600 at different azimuths. As the imaging tool 600 rotates, the real and imaginary impedance measurements change due to the change in standoff. The sensitivity of the real and imaginary impedance measurements to the standoff effect may cause any imaging of the formations adjacent to the borehole 102 of FIG. 8 to be skewed. As such, the processing device 404 of the computing device 400 of FIG. 4 may execute the instructions 408 stored in the memory device 406 to adjust the real impedance measurements modeled in model 900 using a ratio based on the imaginary impedance measurement modeled in model 902.

Figure 10:
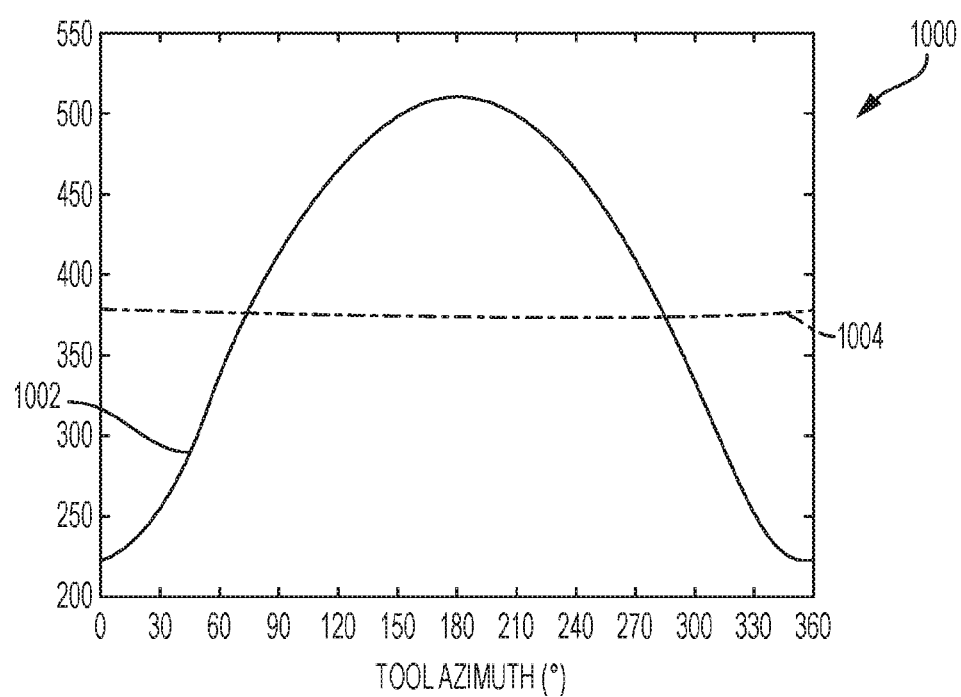
FIG. 10 is a graphical view of a measurement obtained by the imaging tool of FIG. 8 compared to an adjusted measurement determined by the computing device of FIG. 4 according to one aspect of the present disclosure.

FIG. 10 is a graphical view of the real impedance measurement modeled in model 900 of FIG. 9 obtained by the imaging tool 600 of FIG. 8 compared to an adjusted real impedance measurement determined by the computing device 400 of FIG. 4 according to one aspect of the present disclosure. Graph 1000 in FIG. 10 plots the real impedance measured by the imaging tool 600 of FIG. 8 as it rotates in the borehole 102. The x-axis represents the azimuth of the imaging tool 600 as it rotates in the borehole 102. The y-axis represents the real-part impedance at a frequency of 2.25 MHz. Line 1002 represents the original real impedance measurement modeled in model 900 of FIG. 9. Line 1004 represents the adjusted real impedance measurement calculated by the computing device 400 using the instructions 408 stored in the memory device 406 of the computing device 400. The original real impedance measurement represented the line 1002 indicates an inhomogeneous formation at different azimuths of the imaging tool 600 based on the curvature of line 1002. The adjusted real impedance measurement determined by the computing device 400 of FIG. 4 and represented by the line 1004 indicates the true model of the formation having homogeneous properties based on the flatness of the line 1004.

Figure 11:
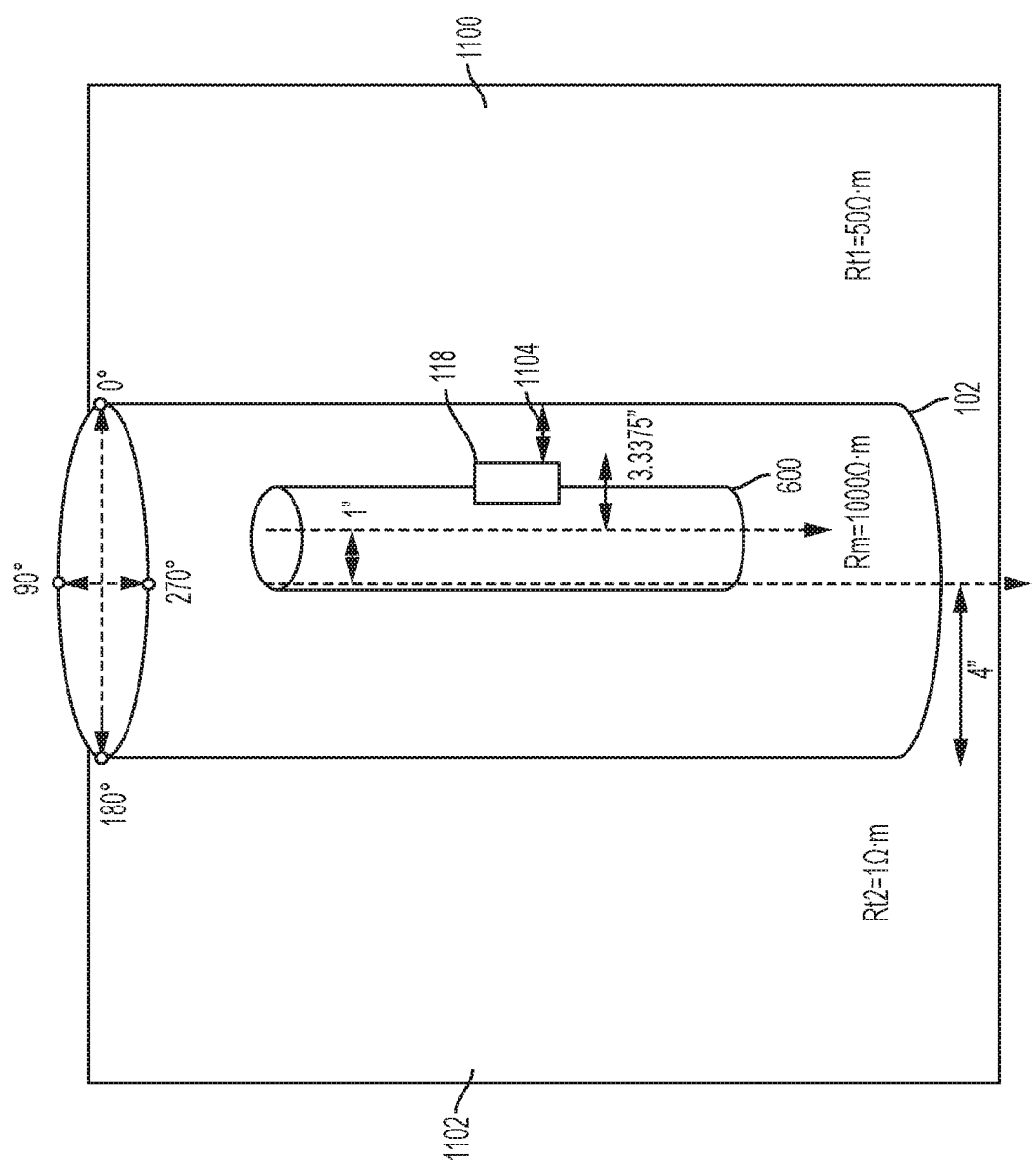
FIG. 11 is a perspective view of an imaging tool positioned in the borehole of FIG. 1 adjacent to an inhomogeneous formation according to one aspect of the present disclosure.

In some aspects, the imaging tool 600 may not be located at the center of the borehole 102 where the formations adjacent to the borehole 102 have inhomogeneous properties. FIG. 11 is a perspective view of the imaging tool 600 positioned in the borehole 102 adjacent to a formation having inhomogeneous properties 1100, 1102 according to one aspect of the present disclosure. The properties 1100 of the formation to the right of the borehole 102 in FIG. 11 include a formation resistivity of 50Ω·m. The properties 1102 of the formation to the left of the borehole 102 include a formation resistivity of 1Ω·m. The resistivity of the mud in the borehole 102 surrounding the imaging tool 600 is 1000Ω·m. The imaging tool 600 is positioned in the borehole such that its vertical axis is one inch away from the vertical axis of the borehole 102. The imaging tool 600 includes the sensor assembly 118 of FIG. 1 on an external surface. The radius of the imaging tool 600 from the vertical axis of the imaging tool 600 to the sensor assembly 118 is 3.3375 inches. As the imaging tool 600 rotates in the borehole 102, the sensor assembly 118 transmits current into the formation adjacent to the borehole 102 to obtain the impedance measurements. The sensor assembly 118 transmits the current into the formation having the properties transmits current into the formation adjacent to the borehole 102 to obtain the impedance measurements. The sensor assembly 118 may face the formation having the properties 1100 when the azimuth of the imaging tool 600 is in the range of −90° (e.g., 270°) to 90°. The sensor assembly 118 may face the formation having the properties 1102 when the azimuth of the imaging tool 600 is in the range of 90° to 270°. The standoff 1104 of the sensor assembly 118 (e.g., the distance between the sensor assembly 118 and wall 110 of the borehole 102) may vary as the imaging tool 600 rotates in the borehole 102 due to the position of the imaging tool 600 being away from the center of the borehole 102.

Figure 12:
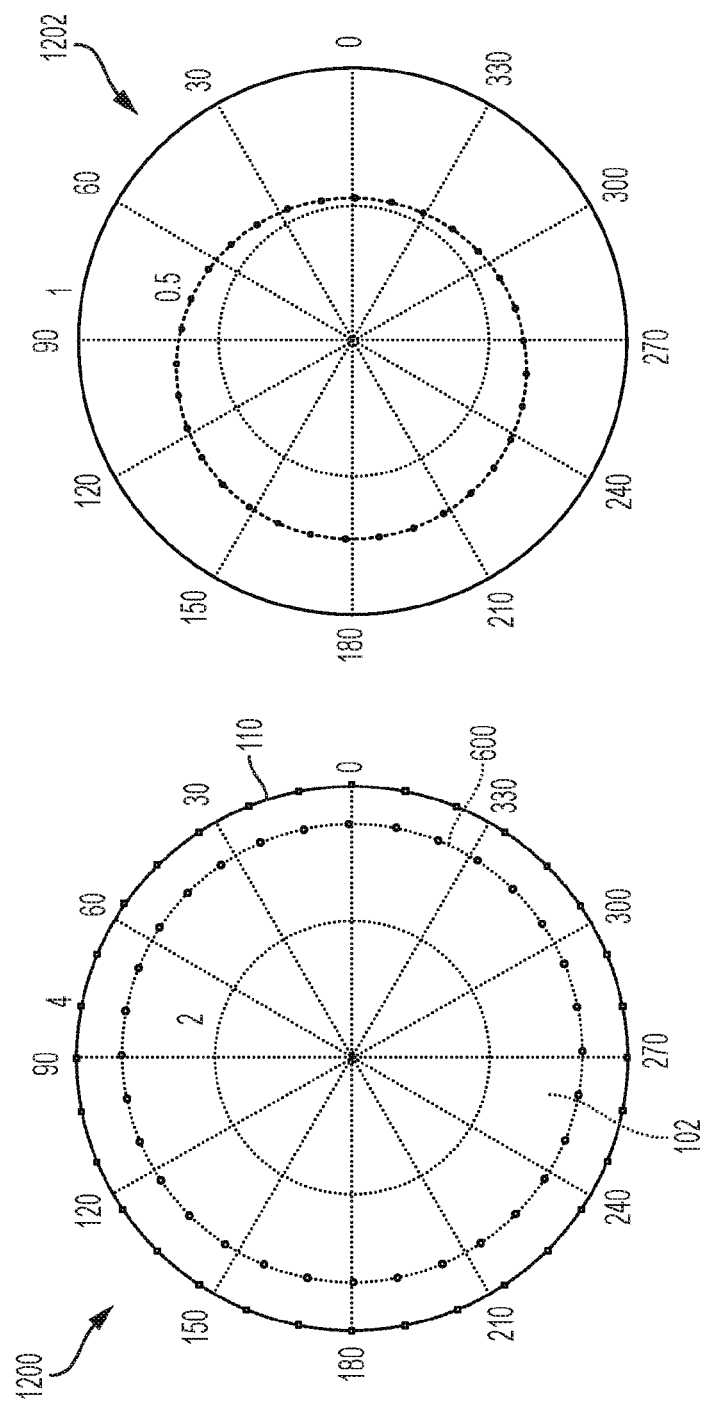
FIG. 12 is a cross-sectional view of an imaging tool positioned off-center in the borehole of FIG. 1 and the corresponding standoff relative to the inhomogeneous formation of FIG. 11 according to one aspect of the present disclosure.

FIG. 12 is a cross-sectional and graphical view of the imaging tool 600 positioned off-center in the borehole 102 and the corresponding standoff relative to the inhomogeneous formation of FIG. 11 according to one aspect of the present disclosure. Graph 1200 shows the imaging tool 600 positioned slightly right of the center of the borehole 102 similar to graph 800 of FIG. 8. Graph 1200 shows the standoff of the imaging tool versus the azimuth of the imaging tool 600 and the changes of the standoff as the imaging tool is rotated in the borehole 102.

Figure 13:
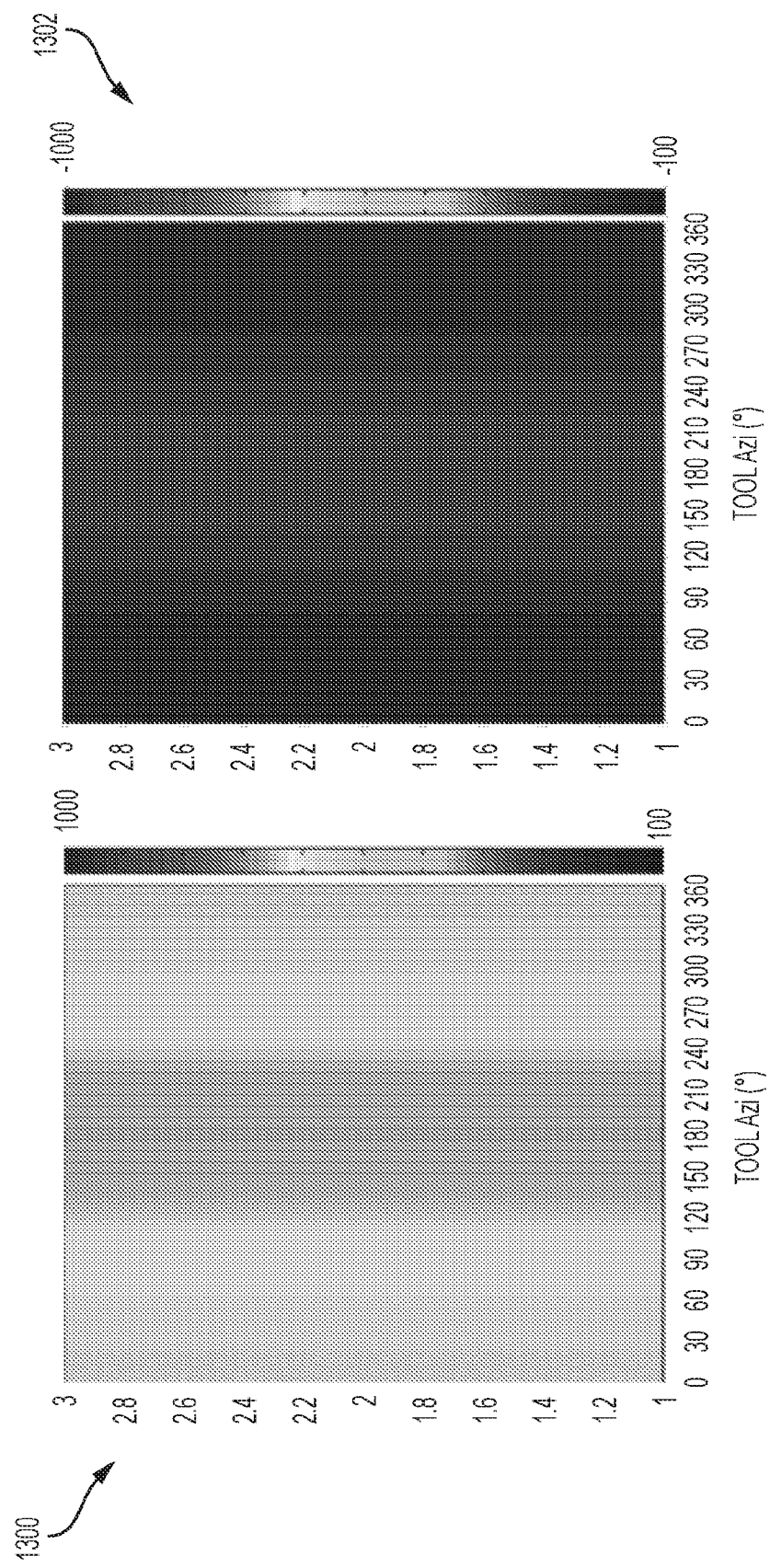
FIG. 13 is a graphical model of measurements obtained by the imaging tool of FIG. 11 according to one aspect of the present disclosure.

FIG. 13 is a graphical model of measurements obtained by the imaging tool 600 of FIG. 11 according to one aspect of the present disclosure. Model 1300 represents the real impedance measurement of the imaging tool 600 and its corresponding sensor assembly 118 at different azimuths. Model 1302 represents the imaginary impedance measurement of the imaging tool 600 and the sensor assembly 118 at the different azimuths. The real impedance measurement represented by model 1300 may distinguish between the different properties 1100, 1102 of the inhomogeneous formation adjacent to the borehole 102 in FIG. 11 due to the sensitivity of the real impedance measurement to both the standoff effect and the formation resistivity. But, the standoff effect may reduce the imaging quality and cause the real impedance measurement to include artificial resistivity measurements at certain azimuths of the imaging tool 600.

Figure 14:
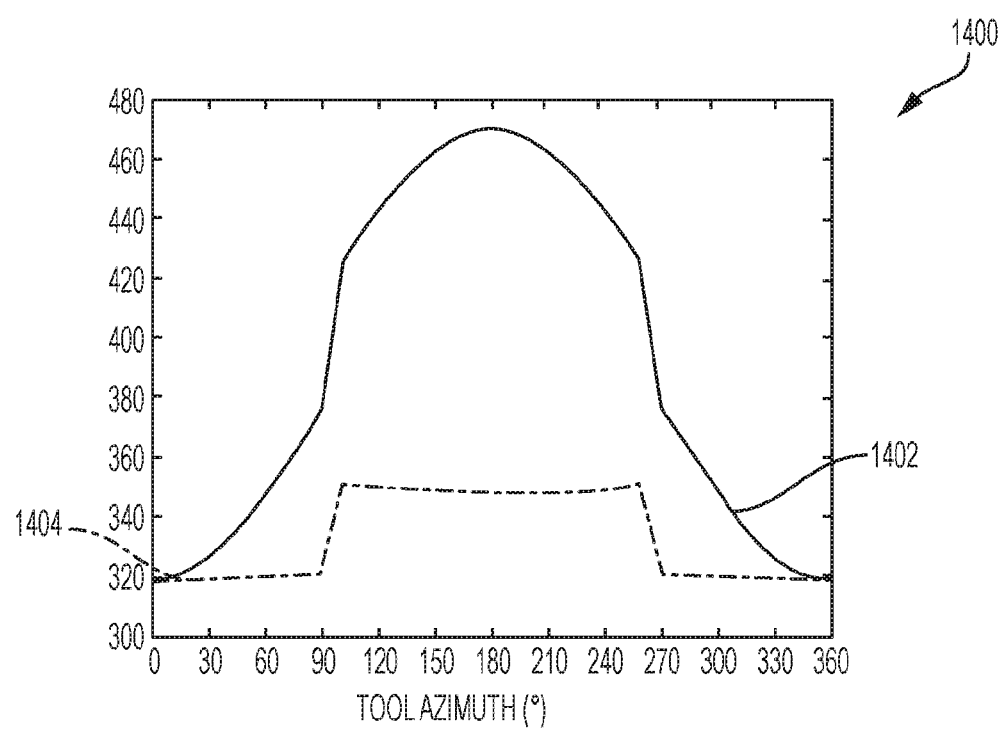
FIG. 14 is a graphical view of a measurement obtained by the imaging tool of FIG. 11 compared to an adjusted measurement determined by the computing device of FIG. 4 according to one aspect of the present disclosure.

FIG. 14 is a graphical view of the real impedance measurement modeled in model 1300 of FIG. 13 and obtained by the imaging tool 600 of FIG. 11 compared to an adjusted measurement determined by the computing device 400 of FIG. 4 according to one aspect of the present disclosure. Graph 1400 plots the real impedance measurement as the imaging tool 60 rotates in the borehole 102. Line 1402 represents the original real impedance measurement modeled in model 1300 of FIG. 13 plotted across the azimuth of the imaging tool as it rotates from 0° to 360° in the borehole 102. Line 1404 represents the adjusted real impedance measurement calculated by the computing device 400 using the instructions 408 stored in the memory device 406. The original real impedance measurement indicates an inhomogeneous formation throughout the azimuth of the imaging tool 600 based on the curvatures of the line 1402. The adjusted real impedance measurement indicates the true model of the formation and clearly distinguishes between the properties 1100, 1102 of the formation of FIG. 11 and the azimuth values at which the formation changes (e.g., 90° and 270°).

Figure 15:
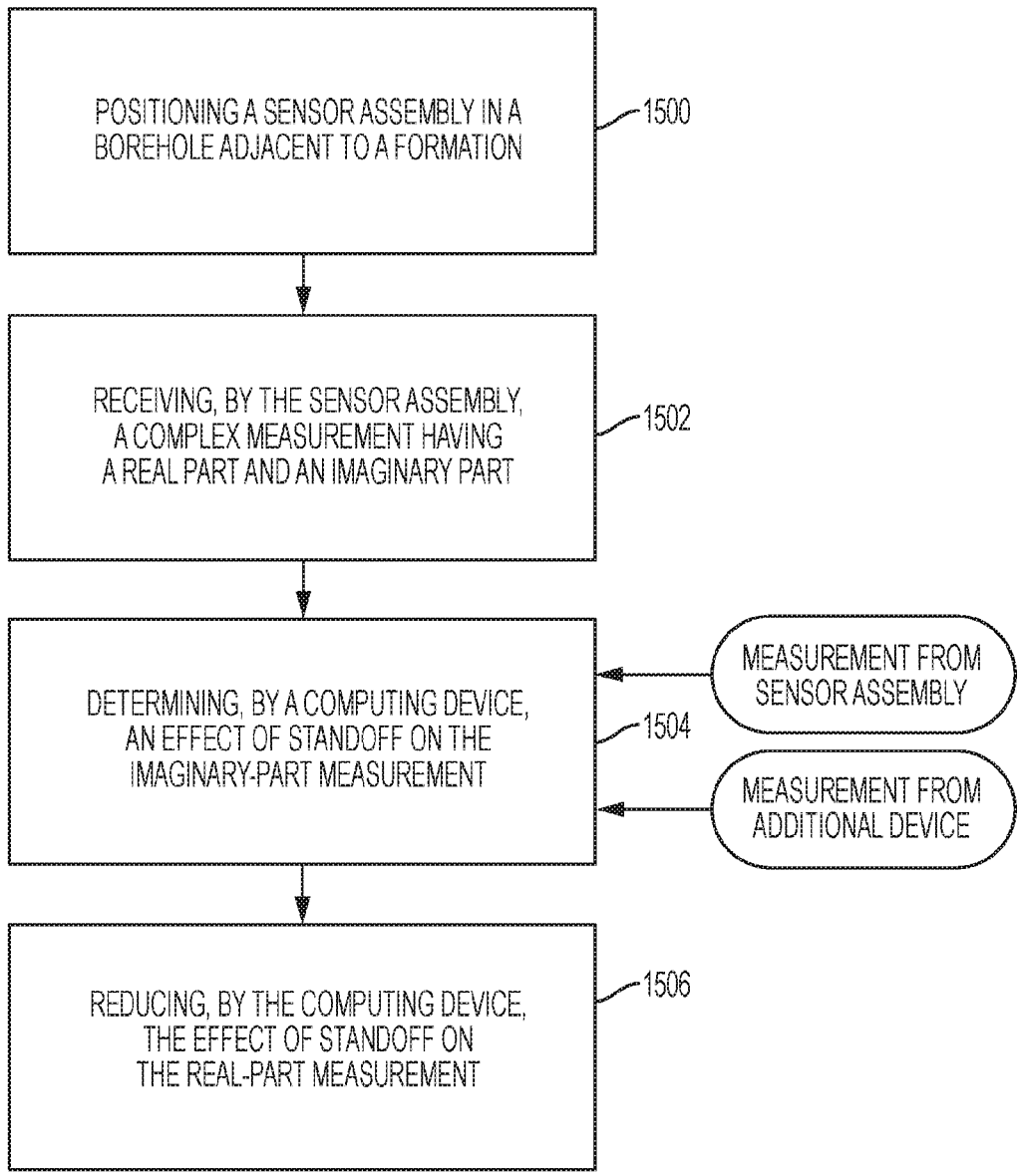
FIG. 15 is a flow chart describing a process for generating an image having a resolution to depict properties of a formation in a wellbore environment according to one aspect of the present disclosure.

FIG. 15 is a flow chart describing an example of a process for generating an image having a resolution to depict properties of a formation in a wellbore environment according to one aspect of the present disclosure. The process is described with respect to the wellbore environment 100 of FIG. 1 and the imaging tool 600 having the sensor assembly of FIGS. 1 and 2 unless otherwise indicated, although other implementations are possible without departing from the scope of the present disclosure.

In block 1500, the sensor assembly 118 is positioned in the borehole 102. In some aspects, the sensor assembly 118 may be positioned on an imaging tool 600. For example, the sensor assembly 118 may be positioned on a stabilizer device such as the stabilizer device 116 described in FIGS. 1-2. In some aspects, the imaging tool 600 may be coupled to the drill string 106 and lowered downhole into the borehole 102 in the bottom hole assembly 112. In other aspects, the imaging tool 600 may be lowered downhole into the borehole via other means, including, but not limited to a wireline, slickline, or coiled tubing. In some aspects, the imaging tool 600 may be centered in the borehole 102 as shown in graph 602 of FIG. 6. In other aspects, the imaging tool 600 may be positioned such that the vertical axis of the imaging tool 600 is not aligned with the center axis of the borehole 102 (e.g., the imaging tool 600 of FIG. 11). In some examples, the sensor assembly 118 may be positioned on a surface of the imaging tool 600 facing a formation 302 adjacent to the borehole 102 (e.g., the wall 110 of the borehole 102 defining an edge of the formation).

In block 1502, the sensor assembly 118 may receive a complex measurement having a real part and an imaginary part. In some aspects, the complex measurements may correspond, at least in part, to the formation 302. For example, the complex measurement may correspond to the resistivity of the formation 302, the resistivity of the medium 300 positioned between the sensor assembly 118 and the formation 302, and the distance between the sensor assembly 118 and the wall 110 of the borehole 102 defining the edge of the formation 302 (e.g., the standoff).

The imaging tool 600 may be configured to rotate in the borehole 102. As the imaging tool 600 rotates, the sensor assembly 118 may face different portions of the formation adjacent to the borehole at different azimuths of the imaging tool 600. In some aspects, the complex measurements may be obtained by the sensor assembly 118 via measurements related to a current transmitted by the sensor assembly 118 toward the formation 302. In some aspects, the measurements may correspond to impedance, voltage, or current at the sensor assembly 118. For example, as shown in FIGS. 5A and 5B, the sensor assembly 118 may be configured to obtain a real impedance measurement and an imaginary impedance measurement at varying frequencies. The sensor assembly 118 of the imaging tool may obtain the measurements 402 corresponding to the formation 302 at the different azimuths of the imaging tool.

In block 1504, the computing device 400 may determine the effect of the standoff on the imaginary part of the measurement. In some aspects, the effect of the standoff may be determined by a ratio using the imaginary-part measurement. The ratio may provide information of the relative standoff change corresponding to different azimuths of the imaging tool 600 as it rotates in the borehole 102. In some aspects, the processing device 404 of the computing device 400 may execute instructions 408 to cause the computing device to determine the ratio. For example, the instructions 408 may include an algorithm for calculating a relative amplitude ratio at different azimuths of the imaging tool 600. In some aspects, additional tools may be used to determine the standoff effect, including, but not limited to, an ultrasonic imaging tool. For example, an ultrasonic imaging tool may be configured to determine a reference measurement. In one example, the reference measurement may include a minimum value, a maximum value, or an average of an imaginary impedance, voltage, or current measurement at a given depth in the borehole 102. In some aspects, the information determined by the additional tools may be stored in the memory device 406 and retrieved by the processing device 404 to determine the effect of standoff on the imaginary-part measurement.

In block 1506, the computing device 400 may minimize, or reduce, the effect of the standoff of the sensor assembly 118 on the real-part measurement. In some aspects, the standoff effect may be reduced by applying the ratio determined using the imaginary-part measurement to the real-part measurement to generate an adjusted real-part measurement. In one example, the computing device 400 may execute an algorithm stored as an instruction 408 in the memory device 406 of the computing device 400 to cause the computing device 400 to multiply an inverse of the ratio with the original real-part measurement. In some aspects, the real-part measurement may include a real-part impedance measurement that is affected by both standoff and formation resistivity. As the ratio corresponds to the change in standoff at different azimuths of the imaging tool 600, multiplying the inverse of the ratio with the real-part measurement may minimize, reduce, or cancel the effect of the standoff on the real-part measurement, resulting in only the effect of the resistivity of the formation 302.

In some aspects, the adjusted real-part measurement may serve as image data for displaying or plotting the properties of the formation 302 on the display unit 414. For example, the image data may include the formation resistivity for an inhomogeneous formation as described with respect to FIG. 11. The computing device 400 may include additional instructions 408 to generate a graphical interface for displaying the formation resistivity and the relative changes in resistivity across the different azimuths of the imaging tool 600 as the imaging tool rotates in the borehole 102. In some aspects, line 1404 of FIG. 14 may represent an enhanced image of the properties of the formation adjacent to the borehole 102.

In some aspects, systems and methods may be provided according to one or more of the following examples:

Example #1

A system may include an imaging tool rotatable in a borehole. A sensor assembly may be positionable on the imaging tool to transmit an electrical current toward a formation adjacent to the borehole. The sensor assembly may include at least one sensor for generating a first measurement that is affected by (1) resistivity of the formation and (2) a distance and a medium between the sensor assembly and the formation. The system may also include a computing device couplable to the sensor assembly. The computing device may include a processing device and a non-transitory computer-readable medium on which instructions are stored that are executable by the processing device to cause the processing device to generate an adjusted first measurement usable to determine a property change in the formation by applying a ratio to the first measurement that is indicative of a relative change in the distance between the sensor assembly and the formation as the imaging tool rotates in the borehole.

Example #2

The system of Example #1 may feature the at least one sensor being positionable on the imaging tool to generate a second measurement that is affected by the distance or medium between the sensor assembly and the formation. The second measurement may be usable to generate the ratio at different azimuths of the imaging tool in the borehole.

Example #3

The system of Example #2 may feature the first measurement including a real-part measurement and the second measurement including an imaginary-part measurement. The first measurement or the second measurement may include one of an impedance measurement, a voltage measurement, or a current measurement.

Example #4

The system of Examples #1-3 may feature the imaging tool being couplable to a drill string for causing the imaging tool to rotate in the borehole. The sensor assembly may be positionable on the imaging tool to obtain the first measurement at different azimuths of the imaging tool during rotation of the imaging tool in the borehole.

Example #5

The system of Examples #1-4 may feature the imaging tool including a stabilizer device having one or more blades. The sensor assembly may be positionable on a blade of the one or more blades.

Example #6

The system of Examples #1-5 may feature the at least one sensor including a guard electrode and a button electrode. The guard electrode and the button electrode may be couplable to a power source for receiving a voltage potential to generate the electrical current. The blade may be couplable to a ground source.

Example #7

The system of Examples #1-6 may feature the ratio corresponding to a relative amplitude of the electrical current transmitted by the sensor assembly.

Example #8

The system of Examples #1-7 may also include a display unit for displaying an image representing the property change in the formation. The non-transitory computer-readable medium may include additional instructions executable by the processing device for causing the processing device to generate the image using the adjusted first measurement.

Example #9

A system may include a sensor assembly positionable in a borehole adjacent to a formation. The sensor assembly may include one or more electrodes couplable to a power device to transmit an electrical current in the borehole in response to a voltage potential applied to the one or more electrodes by the power device. The system may also include a computing device couplable to the sensor assembly for receiving complex measurements from at least one of the one or more electrodes. The complex measurements may include a real-part measurement and an imaginary-part measurement. The imaginary-part measurement may be usable by the computing device to determine a ratio corresponding to a change in standoff of the sensor assembly as the sensor assembly moves in the borehole.

Example #10

The system of Example #9 may feature the one or more electrodes being positionable in the sensor assembly to transmit the electrical current for generating the imaginary-part measurement.

Example #11

The system of Examples #9-10 may feature the complex measurement including to one of an impedance measurement, a voltage measurement, or a current measurement.

Example #12

The system of Examples #9-11 may feature the computing device including a memory device having additional instructions executable by a processing device for causing the processing device to determine the ratio by dividing the imaginary-part measurement by a reference measurement representing one of (1) a minimum value of the imaginary-part measurement at a depth of the sensor assembly in the borehole, (2) a maximum value of the imaginary-part measurement at the depth, or (3) an average of the imaginary-part measurement at the depth.

Example #13

The system of Examples #9-12 may feature the additional instructions being executable by the processing device for causing the processing device to store the reference measurement in the memory device and to retrieve the reference measurement from the memory device for determining the ratio.

Example #14

The system of Examples #9-13 may feature the computing device including a memory device having additional instructions executable by a processing device for causing the processing device to apply the ratio to the real-part measurement to minimize an effect of the standoff on the real-part measurement.

Example #15

The system of Examples #9-14 may also include a display unit couplable to the computing device for displaying image data corresponding to an adjusted real-part measurement. The computing device may feature a memory device including additional instructions executable by a processing device for causing the processing device to apply the ratio to the real-part measurement to generate the adjusted real-part measurement.

Example #16

A method may include obtaining measurements from an imaging tool positioned in a borehole adjacent to a formation, the measurements including at least (1) a real-part measurement that is affected by resistivity of the formation and a standoff of the imaging tool, and (2) an imaginary-part measurement that is affected by the standoff. The method may also include determining a ratio using the imaginary-part measurement, the ratio indicative of an effect of the standoff on the imaginary-part measurement. The method may also include adjusting the real-part measurement to generate an adjusted real-part measurement by applying the ratio to the real-part measurement to reduce the effect of the standoff on the real-part measurement.

Example #17

The method of Example #16 may also include positioning the imaging tool in the borehole. The imaging tool may include a sensor assembly having at least one sensor. The method may also include positioning the at least one sensor toward the formation to obtain the measurements as the imaging tool rotates in the borehole.

Example #18

The method of Examples #16-17 may feature the measurements including at least one of an impedance measurement, a voltage measurement, or a current measurement.

Example #19

The method of Examples #16-18 may feature determining the ratio as including dividing the imaginary-part measurement by a reference measurement representing one of (1) a minimum value of the imaginary-part measurement at a depth of imaging tool in the borehole, (2) a maximum value of the imaginary-part measurement at the depth, or an average of the imaginary-part measurement at the depth.

Example #20

The method of Examples #16-19 may also include displaying, by a display unit, an image representing the adjusted real-part measurement.

The foregoing description of the examples, including illustrated examples, has been presented only for the purpose of illustration and description and is not intended to be exhaustive or to limit the subject matter to the precise forms disclosed. Numerous modifications, adaptations, uses, and installations thereof can be apparent to those skilled in the art without departing from the scope of this disclosure. The illustrative examples described above are given to introduce the reader to the general subject matter discussed here and are not intended to limit the scope of the disclosed concepts.

What is claimed is:

1. A system, comprising:
an imaging tool rotatable in a borehole and including a sensor assembly positionable on the imaging tool to transmit an electrical current toward a formation adjacent to the borehole, the sensor assembly including at least one sensor for generating a measurement that is affected by (1) resistivity of the formation and (2) a distance and a medium between the sensor assembly and the formation; and
a computing device couplable to the sensor assembly and including a processing device and a non-transitory computer-readable medium on which instructions are stored that are executable by the processing device to cause the processing device to generate an adjusted measurement usable to determine a property change in the formation by applying a ratio to a real part of the measurement, wherein the ratio includes an imaginary-part measurement that is sensitive to the distance between the sensor assembly and the formation as the imaging tool rotates in the borehole.

2. The system of claim 1, wherein the at least one sensor is positionable on the imaging tool to generate the imaginary-part measurement that is affected by the distance or medium between the sensor assembly and the formation, the imaginary-part measurement being usable to generate the ratio at different azimuths of the imaging tool in the borehole.

3. The system of claim 2, wherein the measurement includes one of an impedance measurement, a voltage measurement, or a current measurement.

4. The system of claim 1, wherein the imaging tool is couplable to a drill string for causing the imaging tool to rotate in the borehole,
wherein the sensor assembly is positionable on the imaging tool to obtain the imaginary-part measurement at different azimuths of the imaging tool during rotation of the imaging tool in the borehole.

5. The system of claim 1, wherein the imaging tool includes a stabilizer device having one or more blades,
wherein the sensor assembly is positionable on a blade of the one or more blades.

6. The system of claim 5, wherein the at least one sensor includes a guard electrode and a button electrode,
wherein the guard electrode and the button electrode are couplable to a power source for receiving a voltage potential to generate the electrical current,
wherein the blade is couplable to a ground source.

7. The system of claim 1, further including a display unit for displaying an image representing the property change in the formation,
wherein the non-transitory computer-readable medium includes additional instructions executable by the processing device for causing the processing device to generate the image using the adjusted measurement.

8. A system comprising:
a sensor assembly positionable in a borehole adjacent to a formation, the sensor assembly including one or more electrodes couplable to a power device to transmit an electrical current in the borehole in response to a voltage potential applied to the one or more electrodes by the power device; and
a computing device couplable to the sensor assembly, the computing device being configured for:
receiving one or more complex measurements from at least one of the one or more electrodes, the one or more complex measurements including a real-part measurement and an imaginary-part measurement;
determining a ratio based on the imaginary-part measurement, wherein the imaginary-part measurement is sensitive to a change in standoff between the sensor assembly and the formation as the sensor assembly moves in the borehole; and
determining an adjusted real-part measurement usable to determine a property change in the formation by applying the ratio to the real-part measurement.

9. The system of claim 8, wherein the one or more electrodes are positionable in the sensor assembly to transmit the electrical current for generating the imaginary-part measurement.

10. The system of claim 8, wherein the complex measurements include to one of an impedance measurement, a voltage measurement, or a current measurement.

11. The system of claim 8, wherein the computing device comprises a memory device including additional instructions executable by a processing device for causing the processing device to determine the ratio by dividing the imaginary-part measurement by a reference measurement, wherein the reference measurement represents one of (1) a minimum value of the imaginary-part measurement at a depth of the sensor assembly in the borehole, (2) a maximum value of the imaginary-part measurement at the depth, or (3) an average of the imaginary-part measurement at the depth.

12. The system of claim 11, wherein the additional instructions are executable by the processing device for causing the processing device to:
store the reference measurement in the memory device; and
retrieve the reference measurement from the memory device for determining the ratio.

13. The system of claim 8, wherein the computing device comprises a memory device including additional instructions executable by a processing device for causing the processing device to apply the ratio to the real-part measurement to minimize an effect of the standoff on the real-part measurement.

14. The system of claim 8, further comprising a display unit couplable to the computing device for displaying image data corresponding to the adjusted real-part measurement.

15. A method, comprising:
positioning an imaging tool in a borehole adjacent to a formation, the imaging tool including a sensor assembly for transmitting an electrical current into the formation and including at least one sensor for generating one or more complex measurements that are affected by (1) a resistivity of the formation and (2) a distance between the sensor assembly and the formation;
obtaining, by a computing device coupled to the imaging tool, the one or more complex measurements from the imaging tool, the one or more complex measurements including at least (1) a real-part measurement that is affected by the resistivity of the formation and the distance between the sensor assembly and the formation, and (2) an imaginary-part measurement that is affected by the distance between the sensor assembly and the formation;

determining, by the computing device, a ratio using the imaginary-part measurement, wherein the imaginary-part measurement is sensitive to an effect of the distance between the sensor assembly and the formation; and adjusting, by the computing device, the real-part measurement to generate an adjusted real-part measurement by applying the ratio to the real-part measurement to reduce the effect of the distance between the sensor assembly and the formation on the real-part measurement.

16. The method of claim 15, further comprising:

positioning at least one sensor of the sensor assembly toward the formation to obtain the one or more complex measurements as the imaging tool rotates in the borehole.

17. The method of claim 15, wherein the one or more complex measurements include at least one of an impedance measurement, a voltage measurement, or a current measurement.

18. The method of claim 15, wherein determining the ratio includes dividing the imaginary-part measurement by a reference measurement, wherein the reference measurements represents one of (1) a minimum value of the imaginary-part measurement at a depth of the imaging tool in the borehole, (2) a maximum value of the imaginary-part measurement at the depth, or (3) an average of the imaginary-part measurement at the depth.

19. The method of claim 15, further including displaying, by a display unit, an image representing the adjusted real-part measurement.

* * * * *